US006327835B1

(12) United States Patent
Trebbi

(10) Patent No.: US 6,327,835 B1
(45) Date of Patent: Dec. 11, 2001

(54) CHECKING AND CONTROLLING APPARATUS FOR USE IN CAPSULE-PACKAGING MACHINES

(75) Inventor: Roberto Trebbi, San Lazzaro di Savena (IT)

(73) Assignee: I.M.A. Industria Macchine Automatiche S.p.A., Ozzano Emilia (IT)

( * ) Notice: Subject to any disclaimer, the term of this patent is extended or adjusted under 35 U.S.C. 154(b) by 0 days.

(21) Appl. No.: 09/601,380
(22) PCT Filed: Oct. 29, 1999
(86) PCT No.: PCT/EP99/08223
§ 371 Date: Aug. 2, 2000
§ 102(e) Date: Aug. 2, 2000
(87) PCT Pub. No.: WO00/32151
PCT Pub. Date: Jun. 8, 2000

(30) Foreign Application Priority Data

Dec. 3, 1998 (IT) ............................................. BO98A0682

(51) Int. Cl.[7] ..................................................... B65B 57/10
(52) U.S. Cl. .................................................. 53/53; 53/507
(58) Field of Search ............................... 53/53, 502, 507, 53/508

(56) References Cited

U.S. PATENT DOCUMENTS

| 3,797,195 | * | 3/1974 | Brink et al. ............................... 53/37 |
| 3,956,110 | * | 5/1976 | Seragnoli ................................ 209/82 |
| 4,191,294 | * | 3/1980 | McGrath, Jr. et al. ............... 209/135 |
| 4,691,496 | * | 9/1987 | Anderson et al. ....................... 53/53 |
| 4,899,889 | * | 2/1990 | Gamberini et al. .................. 209/535 |
| 4,964,262 | * | 10/1990 | Moser et al. ........................... 53/506 |
| 5,315,807 | * | 5/1994 | Restle et al. ............................. 53/51 |
| 5,626,171 | * | 5/1997 | Mirri ..................................... 141/152 |

* cited by examiner

Primary Examiner—Scott A. Smith
Assistant Examiner—Nathaniel Chukwurah
(74) Attorney, Agent, or Firm—Larson & Taylor PLC

(57) ABSTRACT

The thrusters or the rams for pressing the metered amounts of product into the metering seats are equipped with force transducers which emit an electrical signal proportional to the thrust exerted during the pressing step. This signal is transmitted to the processor for controlling the operation of the packaging machine, which compares the signal with predefined reference values, in order to check whether or not the weight of the metered amounts lies within acceptable values. If it does not, the processor causes expulsion, from the unloading flow of the full capsules, of those capsules with metered amounts which have an unacceptable weight and which, if necessary, may be weighed using a precision device connected to the processor which may use this signal to confirm the operation of the transducers or correct it automatically.

8 Claims, 3 Drawing Sheets

CHECKING AND CONTROLLING APPARATUS FOR USE IN CAPSULE-PACKAGING MACHINES

DESCRIPTION

The invention relates to machines for packaging metered amounts of medicinal product in hard-gelatine capsules and in particular to machines operating intermittently, for example of the type which comprise at least one carousel with a vertical axis onto which there are fixed, via their body, two groups of hollow-punch volumetric metering devices which are angularly arranged at a distance of 180° and are also vertical and oriented downwards with the open end of the hollow punch itself inside which there is axially movable a piston pushed upwards by a resilient means and provided radially with a lug which projects from the said body through a longitudinal slit and which normally rests against a plate mounted on the axis of the said carousel with micrometric means for adjusting the height. By regulating these means it is possible to lower or raise the piston of the metering devices and therefore decrease or increase respectively the volume of the working chamber of the metering devices themselves and consequently it is possible to vary the weight of the metered amounts of product cyclically formed by the latter. In the machines in question, the carousel with the metering devices is cyclically rotated through 180° first in one direction and then in the other and is raised and lowered in synchronism in order to position alternately the two groups of metering devices in two different workstations. One of these stations contains a store inside which a correct layer of the product to be packaged is maintained such that, when a group of metering devices is immersed into this store, the bottom chambers of their hollow punches are filled uniformly with product. In phase succession, thrusters are lowered with a predefined and constant stroke onto the movable element of the lowered metering devices, said thrusters having the function of pressing the metered amount of product isolated into the said metering devices so as to reduce the volume thereof and in particular ensure that the whole metered amount of product remains by means of friction inside the metering devices when these are extracted from the filling store and transferred into the other station for axial alignment and for positioning above the bottoms of the capsules transported by a carousel for handling the hard-gelatine capsules, which in synchronism rotates stepwise about its vertical axis. In this station the metering devices are lowered and arranged with their openings against those of the capsule bottoms into which they discharge the metered amounts of product following the action of special thrusters on the movable element of the said metering devices. The emptied metering devices, after raising of the associated pistons, are raised and rotated through 180° so as to return into the filling station and repeat the cycle described. The thrusters for pressing the metered amounts of product and those for discharging the pressed amounts are mounted with the possibility of adjustment of the height on a same turret which in synchronism with the movement of the metering-device carousel is raised or lowered with a predefined and constant stroke.

Italian Patent No. 1,268,383 dated Apr. 22,1994 (or U.S. Pat. No. 5,626,171), which is in the name of I.M.A. Industria Macchine Automatiche S.p.A. of Italy (the same Applicant as for this invention), describes how it is possible to adjust automatically the volume of the metering devices of the above-mentioned machines and the heightwise position of the thrusters for pressing the metered amounts of product into the said metering devices, depending on the results of a statistical check as to the weight of the gelatine capsules filled with product by the machine and unloaded from the said carousel for handling these capsules, this check being carried out by means of electronic precision scales pre-programmed with the tare of the empty capsules. This checking system is such that, when it detects inaccuracies, incorrectly filled capsules have already been unloaded into the flow of capsules with a correct weight. When medicinal products, which require extremely precise metering, are packaged in the capsules, the current method used consists in a statistical check as to the weight in order to detect any major repetitive malfunctions of the machine during the whole production cycle and then, when a very precise check is required, all the capsules produced by this machine are checked one-by-one using sets of electronic scales, for example using an apparatus of the type described in Italian Patent No. 1,285,463 dated Feb. 26,1996 in the name of the same Applicant. It is obvious how this solution complicates the capsule production cycle and how it makes it longer and more costly.

Finally it must be pointed out that the packaging machines of the abovementioned type and others of the intermittent type (see below) are often used by the research and development centres of pharmaceutical companies in order to check the machine processability or the so-called "machinability" of the new products, with the aim of providing mixtures which are machinable in an easy, precise and as reliable as possible manner both by the intermittent machines in question and by the faster rotary and continuous machines. For this purpose, the current packaging machines to which reference has been made are unable to provide researchers with the values of all the variables necessary for solving all the problems arising from the various situations.

The invention aims to solve these and other limitations of the known art using the following proposed solution. The thrusters for pressing the metered amounts of product cyclically isolated by the groups of hollow-punch volumetric metering devices have, associated with them, respective main force transducers which are able to emit an electrical signal proportional to the thrust which these thrusters exert on the movable element of the metering devices and therefore on the metered amount of product to be cyclically isolated by the latter, such that, for the same stroke of the said thrusters, it is possible to detect, using a special algorithm, any variations in the density and hence the mass or weight of the metered amounts of product cyclically formed in the metering devices. In this way it is possible to check automatically and rapidly the weight characteristics of all the capsules filled by the packaging machine. In order to allow the operators to detect all the parameters necessary for evaluating the flowability and processability of the product for the metering devices, secondary force transducers are also provided on the thrusters which operate in the station for discharging the metered amounts of product from the metering devices and inserting them into the bottoms of the capsules, so as to generate an electrical signal proportional to the thrust which these thrusters exert during discharging of the metered amounts of product from the metering devices. This signal may be adjusted in the same manner as all the other signals and may, if necessary, be used to perform processing of the signal supplied by the main force transducers.

Downstream of the capsule filling carousel there are provided means which separate, into respective channels, the capsules produced by the various metering devices and which, under the control of the processor which manages the operation of the machine, discard any capsules which may be detected as defective by the primary transducers associated with the pressing thrusters which operate in the station for filling the metering devices. The discarded capsules may be subjected to a statistical weight check by means of electronic scales which are connected to the machine processor so as to signal any anomalies in the functioning of the said main tranducers. The capsules which are considered to have a correct weight finally undergo a statistical weight check by means of the known precision means connected to the processor which is thus able to confirm or interrupt operation of the said primary force transducers. In this latter case, the processor may perform processing of the signal supplied by the primary force transducers so as to ensure that the final result of the processing operation tallies with that of the statistical weight check. On the basis of all this information, the processor will regulate operation of the packaging machine and if necessary stop it in the event of an irremediable malfunction. By means of the programming/interrogation/recording group associated with the processor it will be possible to detect all the data of an operating cycle and if necessary perform autodiagnostics routines in order to determine any causes of machine malfunctions.

These and other objects are achieved by means of an apparatus, the characteristic features and advantages of which will become clear from the following description of a preferred embodiment of the said apparatus, illustrated purely by way of a non-limiting example in the figures of the accompanying sheets of drawings, in which.

Figure 1:
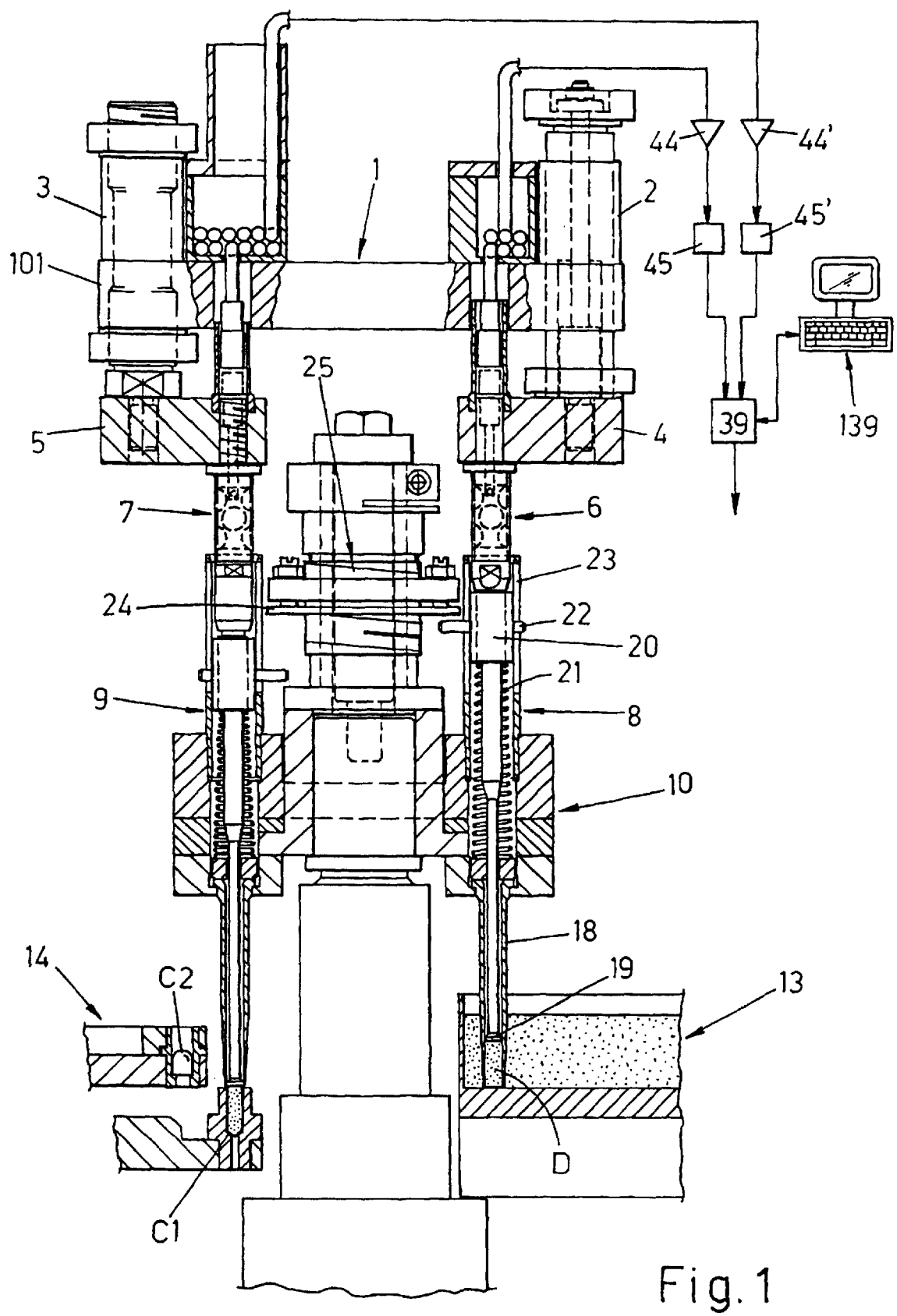
FIG. 1 is a side view, with parts in section, of the metering-device carousel co-operating with the pressing and discharging thrusters equipped with the force transducers.
Figure 2:
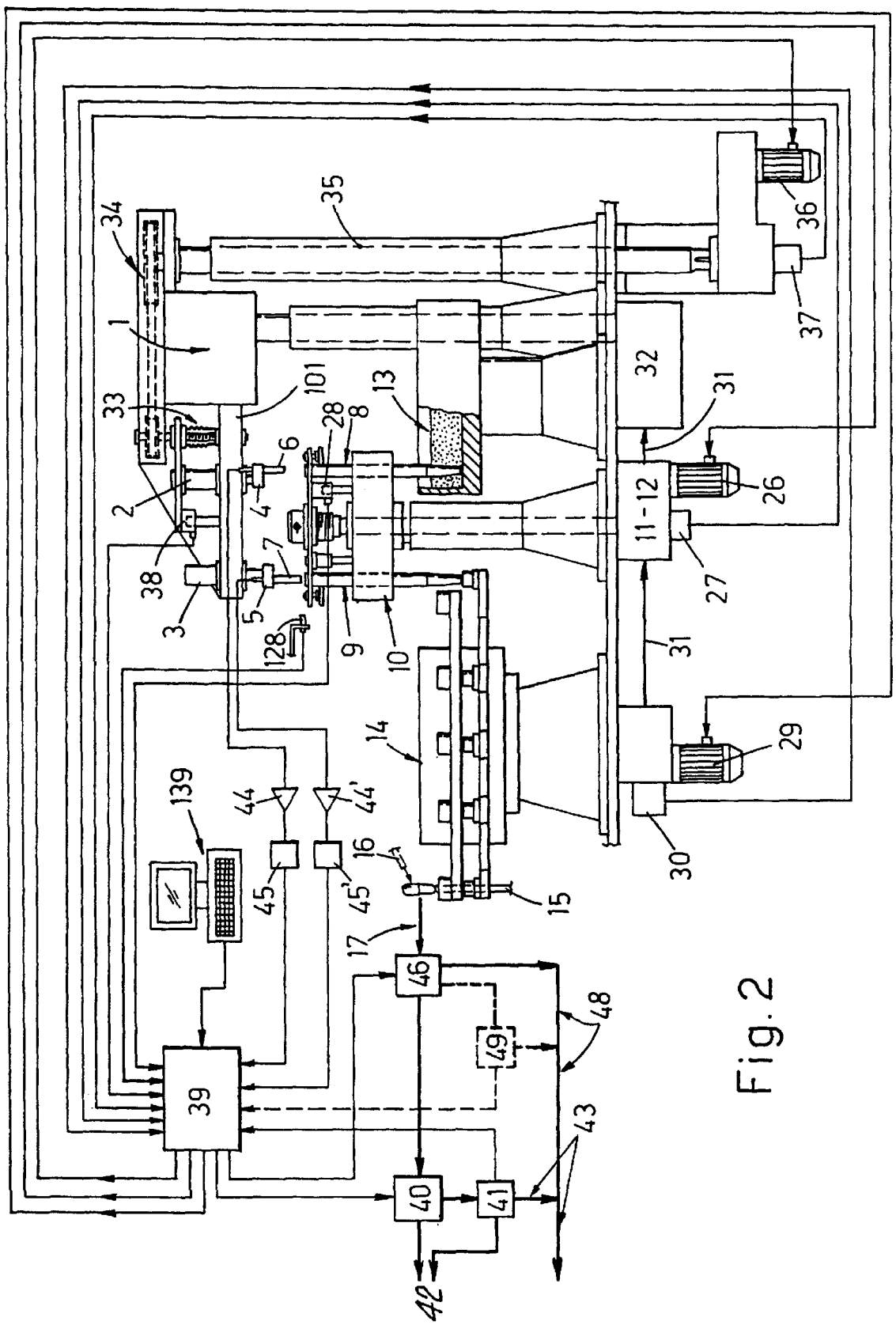
FIG. 2 shows a block diagram of the apparatus according to the invention, mounted on a possible automatically adjustable packaging machine of the type in question.
Figure 4:
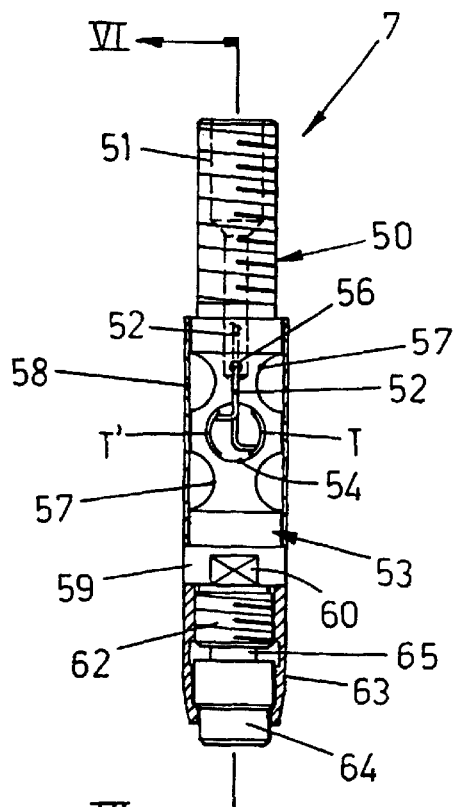
FIGS. 3 and 4 are side elevation views, with parts in section, of a pressing thruster and an expulsion thruster provided with force transducers, respectively.
Figure 6:
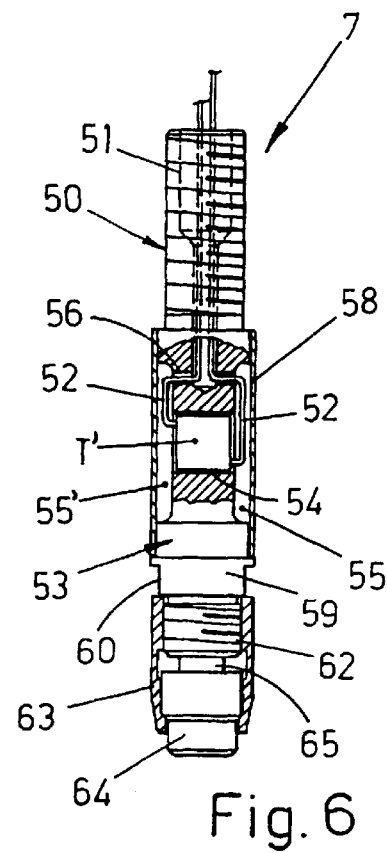
FIGS. 5 and 6 show further details of the thrusters according to FIGS. 3 and 4, partly in section along the respective lines V—V and VI—VI.

In FIGS. 1 and 2, 101 denotes the platform of the turret 1 of a packaging machine of the type in question, which carries the adjusters 2 and 3 with the lower supports 4 and 5 which support the vertical downward-directed ends of the thrusters 6 and 7 intended respectively for pressing and discharging metered amounts of product into and from the groups of hollow-punch volumetric metering devices 8 and 9 which are fixed, via their bodies and at a mutual angular distance of 180°, on the vertical-axis carousel 10 which by known means 11 and 12 is actuated so as to be raised, lowered and rotated alternately through 180° so that a group of the said metering devices on one side is immersed in the product store 13 so as to isolate respective volumetrically predefined metered amounts D of the said product and so that the other group of metering devices, with the metered amount of product formed in the preceding cycle, is arranged on the upper opening of the bottoms C1 of the hard-gelatine capsules which, together with the associated covers C2, are supported by the peripheral seats of a vertical-axis carousel 14 which rotates stepwise about its axis so as to transfer corresponding groups of its seats which are initially empty into a station, not shown, for supplying the capsules and then into a successive station for opening the said capsules, followed by a station for aligning the capsules with the groups of discharging metering devices, and then into a successive station where the bottoms C1 of the full capsules are closed with the associated covers C2, and finally into a station where the full and closed capsules are raised from the corresponding seats by raising devices 15 and unloaded with the aid, if necessary, of a jet of air emitted by the nozzles 16 into respective unloading channels 17. The carousel 14 is also provided, where necessary, with a station for cleaning its seats and prior to and/or after the filling station is provided with one or more stations for introducing tablets and/or retarding agents into the bottoms of the capsules. 29 denotes the drive unit of the carousel 14 which has an encoder 30 and which, by means of a positive drive transmission, schematically indicated by 31, activates the means 11 and 12 for operating the metering-device carousel and the means 32 for raising and lowering the turret 1 which carries the group of thrusters 6 and 7.

The volumetric metering devices terminate at the bottom in an associated hollow punch 18 inside which there is movably arranged a small piston 19 which is integral with an upper stem having an enlarged head 20, this stem being axially slidable in the body of the said metering device, being pushed upwards by a spring 21 and being retained inside the said body of the metering device by a small pin 22 which is fixed transversely to the said head 20, and which co-operates with an eyelet of suitable length 23 provided longitudinally in the same body of the metering device. The eyelet 23 generally has a helical configuration so as to ensure that when the piston 19 travels axially inside the hollow punch, the latter performs simultaneously a slight rotation which prevents the said piston from sticking to the metered amount of product isolated inside the hollow punch both during pressing of the metered amount and during the subsequent stage of discharging of the metered amount itself. The distance of the piston 19 from the lower edge of the hollow punch 18 defines the volume of this hollow punch with available for filling with the product, and determines the consequent volume and the weight of the metered amount of the said product to be formed. This volume is defined by the contact of the pins 22 of the metering devices with a plate 24 which is mounted on the axis of the carousel with the possibility of heightwise adjustment by means of a screw/female thread adjusting system 25 of the known type. In the remotely adjustable metering device shown in FIG. 2, provided in accordance with Italian Patent No. 1,268,383 cited in the introduction of the present description, the adjusting system 25 is remotely actuated by a drive unit 26, with control of the speed and the phase-timing, comprising brake and encoder 27, and the heightwise displacement imparted to the plate 24 is controlled, in a feedback loop, with a linear transducer 28 and an end-of-travel stop 128. In the said metering device in question, the adjusters 2 associated with the thrusters 6 pressing the metered amounts of product into the metering devices are axially guided on the platform 101 and are joined to a height adjuster 33 of the screw/female thread type which is supported by the said platform 101 and which, by means of a positive drive transmission 34, is connected to a vertical shaft 35 which is integrated in the system of vertical guides of the turret 1 in question and which, with its lower longitudinally splined end, is connected to a drive group 36 for controlling the speed and phase-timing, comprising brake and encoder 37, which are located with the other drive systems in the bottom part of the machine. The adjuster 33 also has, associated with it, a linear displacement transducer 38 for feedback control of operation of the motor 36. The various motors of the machine are managed by the processor unit 39 with the associated interrogation/programming/recording terminal 139. The aforementioned transducers 28 and 38 are also connected to the processor 39.

The capsules filled with the predefined metered amount of product, upon leaving the unloading conveyor 17, are removed at predefined intervals by a switching device 40 and positioned on electronic precision scales 41 which generate an electrical signal proportional to the weight detected and transmit it to the processor. 39 which compares the signal with predetermined minimum and maximum reference values, within which the capsules are considered suitable for use and then conveyed into the production flow 42 with acceptable weight, and outside of which the said capsules are conveyed into the reject flow 43. If unacceptable values are detected by the apparatus 41 for statistical checking of the weight of the capsules discharged by the machine, the processor 39 automatically activates the motor 26 so as to vary suitably the volume of the metering devices 8 and 9 and activates the motor 36 so as to vary the heightwise position of the pressing thrusters 6 in order to keep the pressing thrust exerted by these thrusters at a predefined value.

In a machine of this type or in similar machines which have similar operating problems, the invention envisages the following improvements (see below).

At least the pressing thrusters 6 are provided with respective force transducers which are able to emit an electrical signal having a value proportional to the thrust which these thrusters exert on the metered amount of product isolated in the hollow punch of the metering devices, so that, for the same stroke of the thrusters, with the transducers in question it is possible to detect a parameter relating to the resistance which the thrusters encounter during pressing and therefore proportional to the density of the product processed and to the volume of the metered amount of product pressed and therefore to mass or the weight of the metered amount itself. Preferably the discharge thrusters 7 are also provided with respective force transducers for detecting the resistance which these thrusters encounter during discharging of the metered amount of product from the respective metering devices, so as to detect a further parameter relating to the density of the product which is being processed. The electrical signals produced by the force transducers combined with the thrusters 6 and 7 are amplified by units 44, 44', are then converted into digital form by units 45, 45' and finally are sent to the processor 39 which processes them and compares them with predetermined minimum and maximum threshold values and generates the resultant signals.

With this solution, by means of the force transducers associated with the pressing thrusters 6, it is possible to have a system for overall checking of the quality of production of the packaging machine, this checking operation being then approved or rejected at least by the action of more precise means 41 for statistically checking the weight of said production.

The signals supplied by the transducers associated with the discharge thrusters may if necessary be used to perform processing of the signals supplied by the transducers associated with the pressing thrusters 6.

The quality signals detected by means of the transducers combined with the thrusters 6 may be used by the processor 39 to perform automatic adjustment of the metering machine, for example to vary automatically the volume of the metering devices and vary the heightwise position of the said pressing thrusters as well as deviate, if necessary, towards the reject flow 43, the capsules with the metered amounts of product considered unsuitable for consumption. For this purpose, as illustrated in FIG. 2, the unloading conveyor 17 is provided with switching means 46 which can be operated by the processor 39 and by means of which it is possible to convey the defective capsules towards the unloading point 48 and then into the reject flow 43. In order to ensure a greater operational reliability of the entire apparatus, it may be envisaged that the capsules which reach the unloading line 48 are all checked or samples thereof checked by a precision weighing system 49 (or by the system 41) which transmits the signal detected to the processor 39 so as to confirm the operation of the said transducers associated with the thrusters 6 or reject it and if necessary determine by means of the processor 39 a suitable correction of the parameters for processing the signal supplied by the said transducers, so that the results of this processing operation are always as far as possible the same.

The unloading conveyor 17 may operate by means of gravity, or better, may be of the positive type, for example of the transfer type or carousel type operating by means of suction, so as to retain positively the capsules immediately on leaving the seats of the carousel 14 and transfer these capsules, by means of the successive discarding steps, if they are detected as defective by the transducers associated with the thrusters 6, or by means of the steps involving statistical weighing or unloading of the suitable product into the flow, with a sequence which may also be different from that described hitherto. By means of an encoder associated with these positive transportation means it will be possible to know at any time the exact spatial position of the capsules transported and also know precisely which metering device each capsule comes from. This variation has not been illustrated in the drawings in that it may be easily deduced and easily realized by persons skilled in the art on the basis of the description provided.

With reference to FIGS. 3 to 6, a possible constructional design of the thrusters 6 and 7 with the force transducers is now described. Starting from the top, the body of the thrusters has at least three cylindrical sections with a diameter increasing downwards, in which the upper section 50 is threaded for fixing to the supports 4 and 5 and is axially hollow as indicated by 51 for receiving the electrical conductors 52 leading to the transducers. The middle section 53 has, in a middle position, a transverse through-hole 54, the ends of which open out on flattened, facing, identical and parallel parts 55, 55', above which there emerge the ends of a small hole 56 which is parallel to that 54 and which intersects the cavity 51 for receiving the electrical conductors 52 connected to the force transducers T, T' fixed onto the internal side wall of the hole 54 which is then filled with a suitable electrically insulating and self-hardening resin which keeps the transducers in position and subjects them to a suitable pre-stressing force. The section 53 of the thruster body, in the middle portion where the facing flattened areas 55, 55' are situated, has at its ends identical and opposite semi-circular recesses 57, with an axis of curvature parallel to the axis of the hole 54, which have the function of conferring an adequate degree of elasticity on the said section 53 of the body of the thruster such that, when the latter exerts a thrust on the movable element of the metering devices, the transducers T, T' detect the resilient microdeformation induced by the thrust in the seat 54 which houses them and emit an electrical signal having a value proportional to that of the said thrust.

Figure 3:
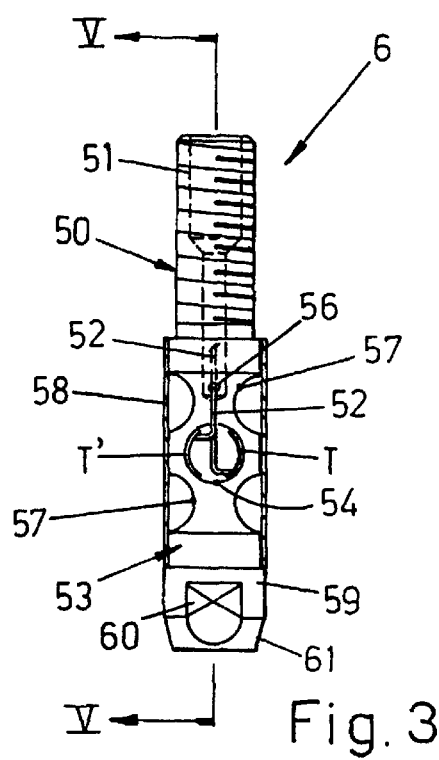
Figure 5:
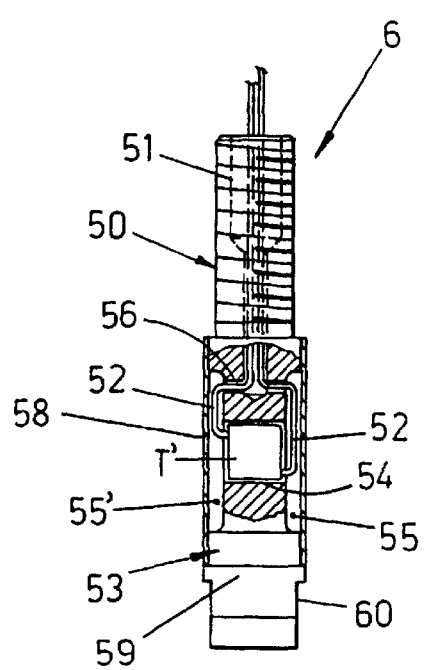

The middle section 53 of the thruster body is fitted with a bush 58 which is made of a suitable material, for example plastic, and which rests on the bottom and larger-diameter section 59 of the thruster provided with facing flattened areas 60 for co-operation with a spanner which allows screwing of the section 50 of the thruster into the appropriate support seat. The thrusters 6 intended for pressing the product perform a small stroke in co-operation with the movable element of the metering devices, so that essentially they do not detect the rotary component of this movable element and terminate in a tapered portion 61 which touches directly the said movable element, as illustrated in FIGS. 1, 3 and 5. The thrusters 7 for discharging the metered amounts of product from the metering devices perform, on the other hand, a stroke of a larger degree in co-operation with the movable element of the thrusters so that they would detect the rotary movement of this movable element which would cause undesirable rubbing friction in the zone of contact between the two parts. In order to prevent said friction, the section 59 of the thrusters 7 terminates in a threaded shank 62, as can be seen from FIGS. 4 and 6 which has, screwed onto it, a bush 63 which rotatably supports an end-piece 64 partly projecting from the said bush and which touches the said shank 62 via any means 65 able to reduce the friction, for example a ball, or better, a small axial ball bearing.

What is claimed is:

1. A capsule-packaging machine (a) for detecting functions relating to the mass or weight and hence to the processing of metered amounts of loose product being packaged inside hard-gelatin capsules in the capsule-packaging machine and (b) for automatic adjustment of the capsule-packaging machine so as to keep the capsules with the metered amounts of product therein within predetermined weight values, said packaging machine comprising:

(a) a handling carousel which rotates stepwise about a vertical axis thereof, the carousel (i) receiving groups of capsules, (ii) sequentially arranging bottoms of the capsules opposite a filling device, and (iii) then closing and transferring the full capsules towards an unloading device;

(b) volumetric metering devices which co-operate with a store which supplies a product to be metered into the bottoms of capsules, each respective metering device removing from the store an amount of the product proportioned to a volume of a free seat of the metering device and transferring the amount of product in the free seat to above the bottom of a capsule presented by the handling carousel;

(c) a pressing thruster associated with the metering devices for pressing the product located inside of the free seat of the metering device;

(d) a discharging thruster associated with the metering devices for discharging the pressed product from inside the free seat of the metering device into the bottom of the capsule;

(e) a transportation means for removing the capsules filled with product from the handling carousel towards a usable product line;

(f) a processor which governs an automatic operation of the capsule-packaging machine; and (g) a checking and controlling apparatus including
      (i) a force transducer associated with one of the pressing thruster or the discharging thruster, said force transducer emitting an electrical force signal proportional to a force which the one of the thrusters exerts on the product in a then associated metering device, and
      (ii) amplifying means for amplifying, for processing and for transferring the electrical force signal to the processor; and
      wherein said processor compares the electrical force signal with predetermined parameters relating to an acceptable mass or weight condition for the amount of product in the then associated metering device such that electrical force signals outside of the predetermined parameters cause said processor to (i) emit an alarm signal, (ii) correct one of a volume of the metering seats or a heightwise position of the pressing thrusters, and (iii) deviate to the reject line the then filled capsule which was associated with the alarm signal.

2. A checking and controlling apparatus as claimed in claim 1, further including:

a precision means for checking a mass or weight of the capsules deviated to the reject line by said processor and for transferring to said processor an electrical signal proportional to the mass or weight detected so that said processor is able to determine whether the mass or weight of the capsules deviated to the reject line are improper and hence to check an operation of said force transducer associated with the one of the thrusters so that, where necessary, said processor modifies the predetermined parameters or the electrical force signals emitted by said force transducer when the mass or weight of the capsules deviated to the reject line are not improper.

3. A checking and controlling apparatus as claimed in claim 2, further including:

a deviating means for periodically deviating selected filled capsules to said precision means such that said processor also periodically compares the electrical signals produced by the selected capsules with predetermined reference values (i) to determine whether the selected capsules are considered suitable for use and then to convey the suitable selected capsules to the usable product line, (ii) to determine whether the selected capsules are unsuitable for use and then to convey the unsuitable selected capsule to a reject line, and (iii) to perform any correction in one of a volume of the metering seats or a heightwise position of the pressing thrusters.

4. A checking and controlling apparatus as claimed in claim 1, wherein said checking and controlling apparatus further includes:

an other force transducer associated with an other one of the pressing thruster or the discharging thruster, said other force transducer emitting an other electrical force signal proportional to a force which the other one of the thrusters exerts on the product in a then associated metering device, and an other amplifying means for amplifying, for processing and for transferring the other electrical force signal to said processor; and wherein said processor compares the other electrical force signal with other predetermined parameters relating to an acceptable mass or weight condition for the amount of product in the then associated metering device such that other electrical force signals outside of the other predetermined parameters cause said processor to (i) emit an alarm signal, (ii) correct one of a volume of the metering seats or a heightwise position of the pressing thrusters, and (iii) deviate to the reject line the then filled capsule which was associated with the alarm signal.

5. A checking and controlling apparatus as claimed in claim 1:

wherein said force transducer includes first and second electrical terminals; and wherein said one of said thrusters includes:

a longitudinal body having a top section, a middle section, and a bottom section, a transverse through-hole located in the middle section, symmetrical transverse recesses in the middle section provided above and below said through hole which lighten said longitudinal body, a material which holds said force transducer in said through-hole with a pre-stressing force and with said first and second electrical terminals of said force transducer exiting from opposite sides of said through-hole, symmetrical longitudinally flattened sections in the middle section through which said electrical terminals extend axially upward, said flattened sections being located adjacent said through hole and extending between said transverse recesses, a protection bush which surrounds said through-hole, said recesses and said flattened sections, transverse holes adjacent a top of said flattened sections through which said electrical terminals pass, and an axial hole in said top section which extends through said middle section to said transverse holes and through which said electrical terminals pass out of said longitudinal body.

6. A checking and controlling apparatus as claimed in claim 5:

wherein said middle section has a diameter smaller than said bottom section and greater than said top section;

wherein said top section is threaded for connection to supports of the packaging machine; and wherein said bottom section has a facing flattened areas by which said bottom section is adapted to be gripped by a tool for screwing of said top section into the supports.

7. A checking and controlling apparatus as claimed in claim 6:

wherein said one of said thrusters is said pressing thruster; and wherein said bottom section of said pressing thruster has a flat bottom and sides which taper upwardly and outwardly therefrom.

8. A checking and controlling apparatus as claimed in claim 6:

wherein said one of said thrusters is said discharging thruster; and wherein said bottom section of said discharging thruster includes a threaded portion at an upper end thereof and having a lower base end, an end bush which is threaded onto said threaded portion, a lower end piece projecting from said end bush and rotatably supported thereby, and a means with a low coefficient of friction for connecting said lower base end of said threaded portion with said lower end piece.

* * * * *